March 2, 1937. J. E. TORBERT, JR 2,072,779
TESTING AND SETTING DEVICE FOR ARTIFICIAL HORIZON INSTRUMENTS
Filed Sept. 16, 1935 4 Sheets-Sheet 1

Inventor
J. E. Torbert, Jr.
By Lacey & Lacey, Attorneys

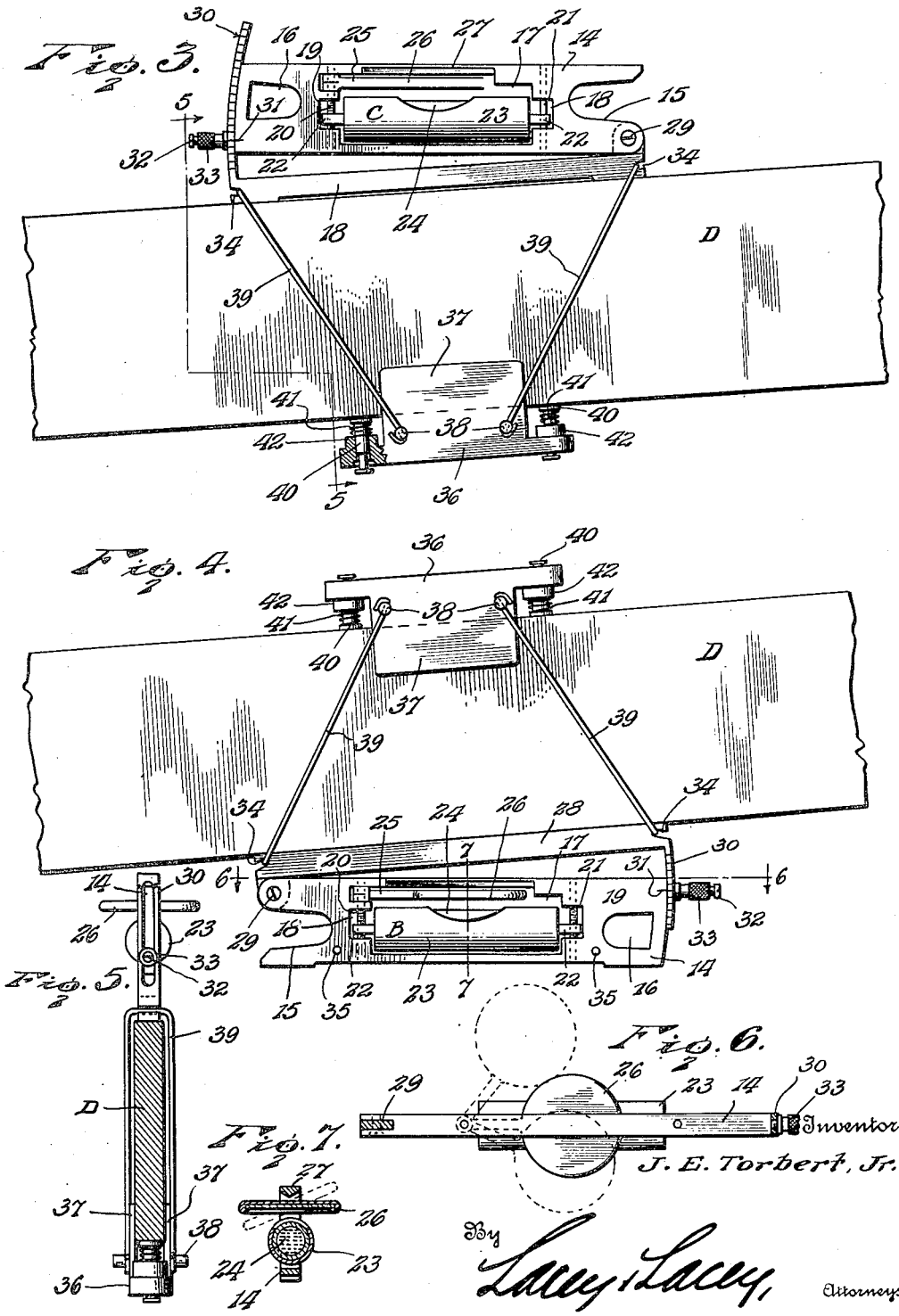

March 2, 1937.  J. E. TORBERT, JR  2,072,779
TESTING AND SETTING DEVICE FOR ARTIFICIAL HORIZON INSTRUMENTS
Filed Sept. 16, 1935  4 Sheets-Sheet 3

Inventor
J. E. Torbert, Jr.
By Lacey & Lacey,
Attorneys

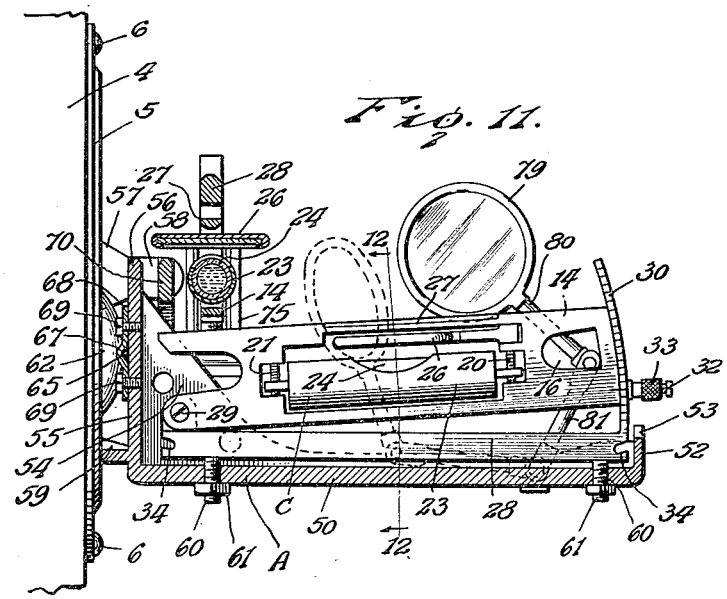
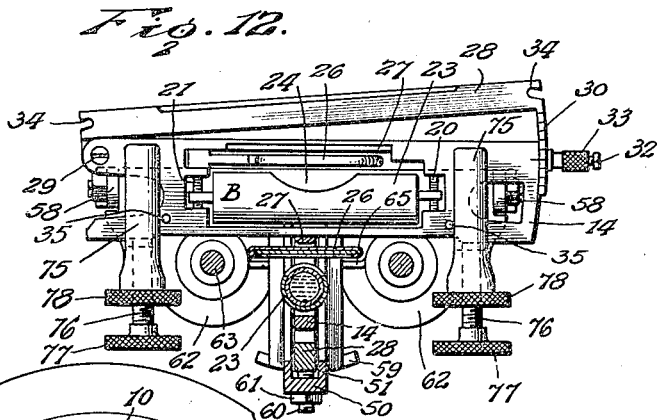
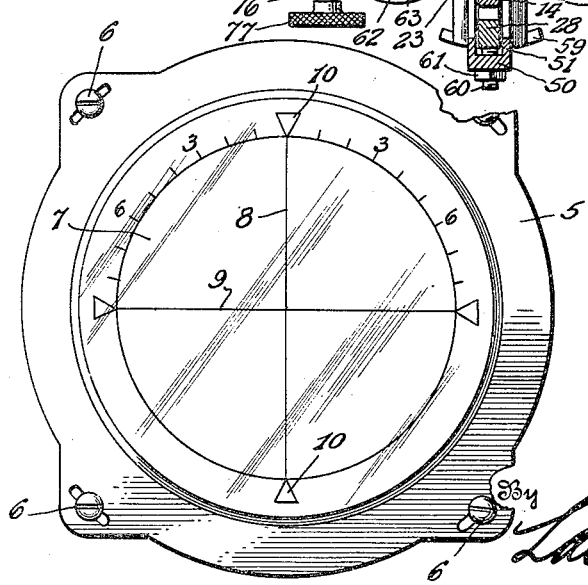

Patented Mar. 2, 1937

2,072,779

UNITED STATES PATENT OFFICE 2,072,779

TESTING AND SETTING DEVICE FOR ARTIFICIAL HORIZON INSTRUMENTS

John E. Torbert, Jr., National City, Calif.

Application September 16, 1935, Serial No. 40,833

13 Claims. (Cl. 33—211)

This invention relates to an instrument for use when installing, checking, or resetting an artificial horizon instrument in an aircraft, and one object of the invention is to provide a device of this character which is so constructed that elements thereof constituting levels may be applied to the fuselage and wings of an airplane resting upon sloping or rough ground and accurately set and then transferred to a supporting bracket applied to the glass of an artificial horizon instrument in the cockpit of the fuselage so that this artificial horizon instrument may be very accurately checked and secured in a set position without it being necessary to accurately level the aircraft itself.

Another object of the invention is to provide improved means for applying the level carrying elements to the fuselage and wings of an airplane and then adjusted until the bubble glasses of the levels show a level position, means being also provided for permitting the bubble glasses of the levels to be watched when they are in a position above the head of the operator.

Another object of the invention is to provide a bracket adapted to be applied by suction cups to an artificial horizon instrument and the artificial horizon instrument then adjusted until the bubble glasses show a level position and thus indicate that the horizontal line of the artificial horizon instrument is in proper parallel relation to the wings of the airplane.

Another object of the invention is to so construct the bracket which is applied to the artificial horizon instrument that the level carrying elements may be very easily set in place after being removed from the fuselage and wings of the aircraft and securely held in place.

Another object of the invention is the provision of a mirror carried by the portion of the bracket to which the level removed from the fuselage is applied and allow the operator who occupies the pilot's seat in the cockpit to easily watch the bubble glass of the level during checking of the artificial horizon instrument.

Another object of the invention is to so form the portion of the bracket which supports the level removed from the wings that this portion of the bracket may be swung out of the way during application or removal of the level which is applied to the fuselage.

Another object of the invention is to provide a device of this character wherein the levels are equipped with mirrors movable into position to permit the operator to easily see a reflection of the bubble when the levels are applied to the fuselage and wings, the mirrors being also movable to a position where they will be out of the way when the levels are applied to the bracket and not interfere with the operator having a clear view of the levels during actual adjustment of the artificial horizon instrument.

The invention is illustrated in the accompanying drawings, wherein

Figure 3 is an enlarged view of the level shown in Figure 1.

Figure 4 is an enlarged view of the level shown in Figure 2.

Figure 5 is a sectional view, taken along the line 5—5 of Figure 3.

Figure 6 is a sectional view, taken along the line 6—6 of Figure 4.

Figure 7 is a sectional view, taken along the line 7—7 of Figure 4.

Figure 11 is a sectional view, taken along the line 11—11 of Figure 9 and showing the bracket applied to the face of an artificial horizon instrument with the levels of Figures 1 and 2 applied to the bracket.

Figure 12 is a sectional view, taken along the line 12—12 of Figure 11.

Figure 13 is a view looking at the face of the artificial horizon instrument.

Figure 1:
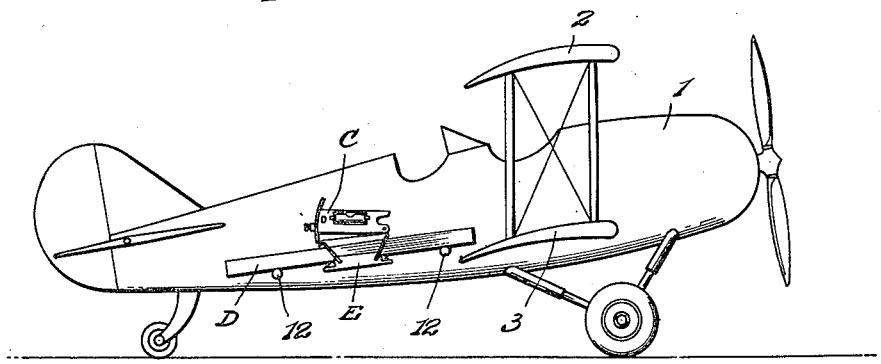
Figure 1 is a view in side elevation showing a level applied to the fuselage of an airplane.
Figure 2:
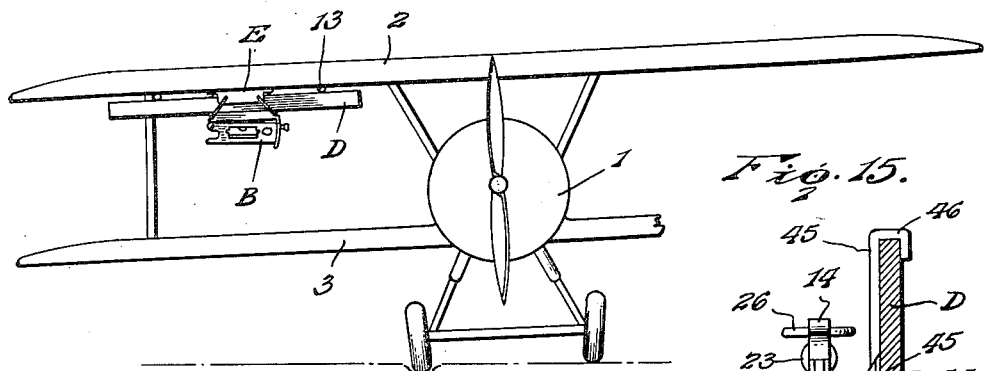
Figure 2 is a view looking at the front of an airplane with a level applied to the upper wing and extending transversely of the airplane.

In Figures 1 and 2 there has been illustrated an airplane of a conventional construction and having the usual fuselage 1 and upper and lower planes 2 and 3. The usual instrument board, indicated by the numeral 4 in Figure 11, is mounted in the cockpit in front of the pilot's seat, and, in addition to other instruments, this board carries an artificial horizon instrument 5 which is secured by screws 6. The artificial horizon instrument has a dial 7 across which are marked a vertical line 8 and a horizontal line 9 and when the instrument is properly set, ends of the lines 8 and 9 will register with the marks 10 and 11 when the airplane is resting upon a level surface. Under present conditions it has been found difficult to properly set the artificial horizon instrument in the instrument board as ends of the horizontal line 9 must register with the marks 11 when the marks are in a true horizontal axis of the plane and if the plane is not resting upon a level surface, proper positioning of the instrument cannot be easily determined. Lugs 12 and 13 are carried by the fuselage and upper wing and it has been the custom to apply levels to these lugs and shift the plane until the levels read correctly before securing the instrument by means of its screws 6 and this has been found very tedious and often practically impossible.

In order to permit the artificial horizon instrument to be installed and accurately positioned and also permit an instrument in use to be easily checked and corrected if necessary, I have perfected an improved instrument which is so constructed that the artificial horizon instrument may be accurately installed or checked and corrected if necessary when the airplane is resting upon a landing field having an uneven surface. This improved instrument consists, briefly, of a bracket A having means for attaching it to the artificial horizon instrument which will hereinafter be described in detail and levels B and C which are to be detachably secured against an edge face of a bar D by a fastener E and the bar then disposed in engagement with the leveling lugs of the wing and fuselage in order that the levels may be set and then removed from the bar and transferred to the bracket. It will thus be seen that when the levels are applied to the bracket after being set, the position in which the airplane is resting upon the ground will be accurately indicated by the levels and the artificial horizon instrument may then be accurately set in its proper position upon the instrument board.

The levels B and C are of substantially duplicate construction, as may be observed from an inspection of Figures 3 and 4, and each has a body 14 formed from a bar of strong metal recessed from one end, as shown at 15, and having an opening 16 formed in its other end portion. A longitudinally extending opening 17 is formed in the bar or body 14 between the recess 15 and the opening 16, and end portions of this opening 17 are reduced in width to provide end pockets 18 and 19 through which extend threaded stems 20 and 21 which engage through threaded openings formed in ears 22 projecting from ends of the cylindrical casings 23 of the bubble glasses 24. It should be noted that the stem 20 serves not only as a carrier for one end of the casing 23 of the bubble glass but also as a carrier for the shank 25 of a mirror 26 and as the mirror has a swiveled connection with its shank which is pivotally carried by the stem 20, the mirror may be swung into and out of a position above the bubble glass, as shown by dotted and full lines in Figure 6, and when it is in place above the bubble glass, it may be tilted out of a horizontal position to an inclined position, as indicated by dotted lines in Figure 7. It will thus be seen that when the level has been secured to the bar D and the bar applied to the leveling lugs of either the fuselage or the wing and is at such a height above the ground that the operator must look upwardly, the mirror may be moved into such a position above the level that the operator may see a reflection of the bubble glass in the mirror and accurately adjust the level to cause the bubble to be centered between the centering lines of the bubble glass. By providing the portion 27 of the body or plate 14 with oppositely beveled faces, as shown in Figure 7, the mirror may be tilted in either direction from a horizontal position to an inclined position indicated by dotted lines in this figure. It will, of course, be understood that if the level is at such a height that the operator may look down toward it when the bar D is applied to the leveling lugs of the airplane, the mirror may be swung out of the opening 17 from a position above the bubble glass and thus permit the operator to have an unobstructed view of the bubble glass.

When the level is in use, it is to be angularly adjusted according to the angular position of the fuselage or wing and, therefore, there has been provided a bar or arm 28 which extends longitudinally of the plate or body 14 and has one end pivoted to the body, as shown at 29. This bar extends the full length of the body and at its other end carries a finger 30 which is curved longitudinally to conform to the curvature of the arcuate end of the body and has one or both side faces provided with gage markings, as shown in Figures 3 and 4 so that when the body is swung away from the arm and the mark 31 provided upon the body moves along the scale or gage markings of the finger, the position to which the body has been moved relative to the arm may be easily determined. A threaded stem 32 projects from the free end of the body through a slot formed longitudinally in the finger 30, as shown in Figure 6, and upon this stem is threaded a fastener 33 which, when tightened, grips the finger and securely holds the plate or body in its adjusted position. Notches 34 are formed in ends of the arm or bar 28 and the body or plate of the level B carries pins 35 which project from opposite sides thereof in spaced relation to its ends. The principal features which distinguish the levels B and C from each other are the fact that pins 35 are not provided upon the body of the level C and the level B has the sight opening of its casing 23 facing in the direction of the bar or arm 28, whereas the level C has the sight opening of its casing 23 facing away from the arm 28. The finger 30 of the level C has been shown longer than the corresponding finger of the level B but these may be of the same length, if so desired.

The bar D to which the levels are to be fastened when determining the position in which the airplane is resting is formed of strong metal, such as steel and is of the same width throughout its length so that its side edge faces are exactly parallel. These edge faces are also accurately cut so that they extend at right angles to the side faces of the bar, as shown in Figure 5. When a level is applied to the bar, its arm 28 is disposed in flat contacting engagement with an edge face of the bar substantially midway the length of the bar where it is securely but detachably secured by the fastener E. This fastener has a block or carrier 36 formed of strong metal and having side wings or plates 37 which are spaced from each other a sufficient distance to permit the bar to fit snugly between the wings. Pins 38, which may be referred to as small rocker shafts, are journaled through the wings with their ends projecting from the wings and these projecting end portions of the rocker shafts are perforated to receive arms of the U-shaped yokes 39. The arms of the yokes after being passed through the openings in the rocker shafts are bent back against the rocker shafts, as shown in Figures 3 and 4, thus firmly securing the yokes to the shafts and permitting the yokes to be swung into position for their bridges to engage in the notches 34 of the arm 28 and the yokes extend in such angular relation to each other that pull exerted will retain the yokes in the notches and hold the bar 28 firmly against the edge face of the bar D. Pressure is to be exerted upon the block or carrier 36 in order to create pull and retain the bridges of the yokes in the notches 34, and in order to do so there have been provided plungers 40 which are slidably mounted through openings formed in end portions of the carrier. Springs 41 surround the plungers between their bar engaging heads and bosses 42 formed upon end portions of the carrier and, therefore, the plungers will be yieldably held in an extended position but when the fastener is applied to the bar D with the bar extending through the yokes and between the wings 37 of the carrier and a level applied to an edge face of the bar opposite the carrier 36, pressure may be applied to the carrier to move it toward the bar a sufficient distance to permit bridges of the yokes to be engaged in notches 24 of the arm 28. The carrier may be then released and expansion of the springs will tend to shift the carrier away from the bar D and thus exert pull upon the yokes which will maintain them in the notches of the arm 28 and securely but detachably hold the level in flat contacting engagement with an edge face of the bar.

Figure 15:
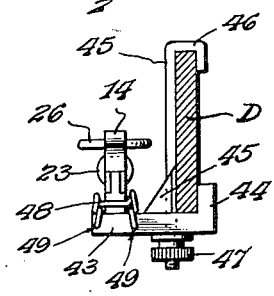
Figure 15 is a sectional view, taken along the line 15—15 of Figure 14.
Figure 14:
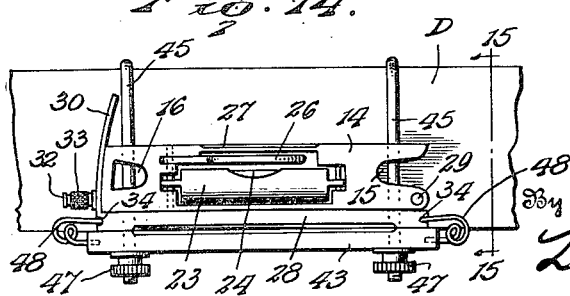
Figure 14 is a view similar to Figure 3 and illustrating means of a modified construction for supporting the level at one side of a bar which is to be applied to the fuselage, as shown in Figure 1, or the wing of the airplane, as shown in Figure 2.

Instead of connecting the level with the supporting bar or carrier D by means of the fastener E, the level may be mounted as shown in Figures 14 and 15. Referring to these figures it will be seen that there has been provided a plate 43 having a rear flange 44 and upstanding lugs 45 spaced from the flange a sufficient distance to snugly receive the lower edge portion of the supporting bar. Bolts 45 having hooks 46 at their upper ends are disposed transversely of the supporting bar with their hooks engaged over the upper edge thereof and their threaded lower end portions passed through openings formed in the plate or bracket 43. Securing nuts 47 are applied to the projecting lower end portions of the bolts and when tightened will draw the bolts and plate into tight binding engagement with upper and lower edge faces of the supporting bar. Therefore, the plate or bracket will be firmly secured but may be removed when so desired. The level rests upon the plate and is detachably secured thereon by spring clips 48 which are formed from strands of resilient wire and are of a U-shaped construction. These clips have their arms mounted in sockets 49 formed in ends of the plate and portions of the clips overhang ends of the plate so that they may be engaged in the notches 34 of the arm 28 of a level. It will thus be seen that the level may be applied to the upper face of the plate or bracket and firmly held in place thereon but may be easily removed after being set.

During use of the improved instrument, the level C may be first applied to the supporting bar or the plate D and the supporting bar is then set in place upon the leveling lugs 12 carried by the fuselage. The nut 33 is loosened and the level adjusted until the bubble is properly centered and the fastener 33 again tightened to hold the level in the set position. This level is then removed and the level B substituted. The bar is then applied to the leveling lugs 13 of the wing and after loosening its securing nut 33, the level is set to properly center the bubble of its bubble glass and the fastener again tightened. When the bar D is applied to the leveling lugs of the wing, the level will be at such a height that the operator can not actually see the bubble glass and, therefore, the mirror 26 will be moved into position above the bubble glass and tilted until the operator has a clear view of a reflection of the bubble glass in the mirror. The mirror of the level C will not be needed if the bar D is applied to the leveling lugs 12 of an airplane having a low fuselage and will be swung out of position over the bubble glass so that the operator may have an unobstructed view of the glass but if the supporting bar is applied to the leveling lugs of an airplane having a high fuselage, the mirror may be moved into position to permit the operator to view the bubble glass through the mirror. It will thus be seen that by applying first one level to the supporting bar and then the other level, the longitudinal incline of the fuselage relative to a true horizontal may be obtained and also the incline of the wings relative to a true horizontal obtained without it being necessary to have the airplane rest upon an exactly level and horizontal surface. When testing the longitudinal angle of the fuselage, the bar D should be applied to the leveling lugs 12 with the securing nut 33 of the level facing the tail of the airplane and when the bar is disposed against the leveling lugs 13 of the wing, the securing nut of the level may be disposed in facing relation to the fuselage, as shown in Figure 2, or toward the outer end of the wing. The operator should carefully note the direction in which the securing nuts extend relative to the fuselage and the wing and dispose them in the same position when the levels are transferred to the bracket A.

Figure 10:
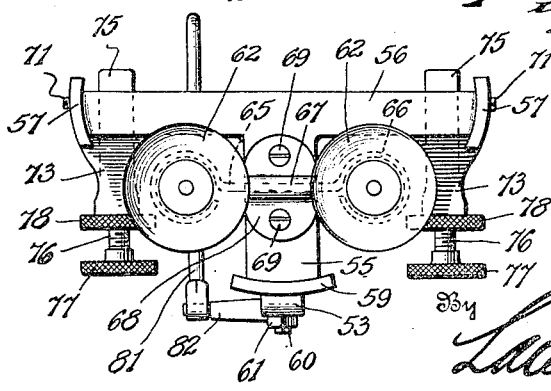
Figure 10 is a view in elevation looking at the front end of the bracket.

The bracket A has a body formed of metal and includes a main bar or arm 50 which extends horizontally and is formed with side flanges 51 and an end flange 52 at its rear end which projects slightly above rear ends of the side flanges and at its upper end is formed with a notch or recess 53. The rear end portions of the side flanges are of somewhat increased depth and their forward end portions are extended upwardly, as shown at 54, to provide triangular webs serving as braces for a head or front plate 55 which may be formed integral with the bar 50 and the webs, or separate therefrom and welded or otherwise firmly secured to the webs and the front end of the horizontal bar. The front plate is of T-shaped formation, as shown in Figure 10, to provide a cross head 56 at the upper end of the plate which projects from opposite sides thereof and at its ends is formed with forwardly projecting lugs 57 and rearwardly extending ears 58. There has also been provided a lug or tongue 59 which projects forwardly from the lower end of the plate 55 and it should be noted that these lugs 57 and 59 are curved to form arcs of a circle and project forwardly from the plate 55 and its cross head an even distance so that when the bracket is applied to the face of the artificial horizon instrument with the lugs bearing against the artificial horizon instrument, as shown in Figure 1, the arm or main bar 50 will be disposed at right angles to the artificial horizon instrument. The side flanges 51 and their webs forming extensions are disposed in such spaced relation to each other that when the level C is set in place upon the supporting arm or bar, it will fit snugly between the flanges and also between the webs and thus be prevented from accidentally tilting transversely and dropping out of place. The stem 32 and fastener 33 are disposed over the end flange 52 and in case the body 14 of the level is disposed against the arm 28, the stem and fastener will extend through the notch or recess 53. Therefore, the level may be set in place between the flanges of the arm 50 where it will rest upon supporting posts 60 which are threaded through the arm or bar, as shown in Figure 11, and carry locking nuts 61. Since the level rests upon posts which are vertically adjustable, its end portions may be shifted vertically after being applied to the bracket and moved into position to center the bubble of the bubble glass.

In order to secure the bracket to the artificial horizon instrument, there have been provided suction cups 62 formed of rubber. These suction cups have metal stems or shanks 63 which project rearwardly and terminate in heads 64 which are roughened so that they may be easily grasped. The cups and their shanks are disposed at opposite sides of the plate 55 in spaced relation thereto and are carried by a yoke 65 formed from a strand of resilient wire, the ends of which are bent to form eyes 66 which fit tightly about the cups. This yoke extends transversely across the front face of the plate 55 and through a channel 67 formed intermediate upper and lower ends of a bearing plate 68 which is secured against the front face of the head plate 55 by screws 69. By this arrangement, the yoke will be held in its proper position in front of the head plate of the bracket but may be turned about its axis in order to permit the suction cups to be moved into flat contacting engagement with the front glass of the artificial horizon instrument. The fact that the yoke is formed of resilient wire also permits the suction cups to have independent movement relative to the bracket and each other and exerts tension which will cause a good suction grip to take place. The suction cups are, therefore, so formed and mounted that when the bracket is to be applied to the artificial horizon instrument, it may be set in place against the front glass of the instrument in such a position that the upper edge of the cross head 56 will be in alinement with the horizontally extending line 9 and pressure then applied to the shanks of the suction cups to force these cups, which have been moistened with glycerine, into tight contacting engagement with the face of the glass. Turning or twisting movement may be applied to the cups so that as much air as possible will be expelled from between the cups and the glass of the artificial horizon instrument and upon releasing the shanks, the partial vacuum created between the cups and the face of the glass will cause the cups to firmly adhere to the glass and hold the brackets in place with the lugs 57 and 59 in flat contacting engagement with the glass. It will thus be seen that the bracket will be firmly held to the glass of the instrument and the arm or bar 50 of the bracket will be disposed at right angles to the face of the glass.

Figure 8:
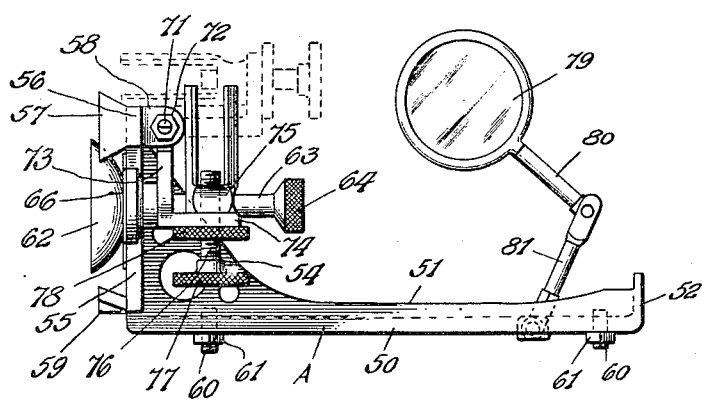
Figure 8 is a view in side elevation of the bracket which is applied to the artificial horizon instrument.
Figure 9:
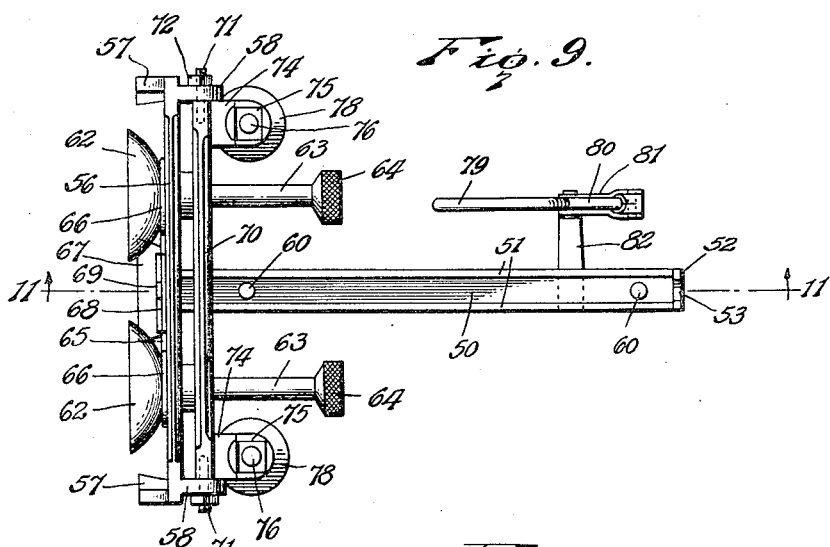
Figure 9 is a top plan view of the bracket illustrated in Figure 8.

In order to support the level B, there has been provided an auxiliary bracket 70 which is also formed of metal and has sockets formed in its ends to receive pivot pins 71 which are threaded through the ears 58 and carry locking nuts 72. By this arrangement the auxiliary bracket will be mounted transversely of the arm or bar 50 of the main bracket just back of the cross head 56 and may be tilted upwardly from a substantially vertical position toward the horizontal position indicated by dotted lines in Figure 8. This auxiliary bracket has arms 73 extending downwardly from its ends and terminating in rearwardly projecting feet 74 and 75 which are U-shaped when viewed as shown in Figure 8 to provide arms spaced from each other longitudinally of the bracket. The arms of the yokes 75 are in such spaced relation to each other that the level B may be snugly received between them and the distance between the yokes is such that when the level is set in place between arms of the yokes, the pins 35 of the level will make contact with inner side edges of the arms of the yokes and thus prevent the level from sliding longitudinally out of its proper position. By having the auxiliary bracket pivotally mounted, it may be swung upwardly out of a vertical position so that it will be out of the way and not interfere with easy application of the level C to the arm or bar 50 of the main bracket and the auxiliary bracket then swung downwardly to its vertical position. The level B may be applied to the yokes of the auxiliary bracket either before or after the auxiliary bracket is returned to its vertical position. Posts 76 which serve as adjustable supports for the level B are threaded through the feet 74 and lower portions of the yokes and at their lower ends are provided with heads 77 which are of sufficient size to be easily grasped and thus permit the posts 76 to be readily turned. Locking washers 78 are provided in order that the posts may be firmly secured after being adjusted. By this arrangement, the level B may be set in place between the arms of the yokes and the supporting posts 76 then adjusted until the upper edge of the level extends parallel to the horizontal line 9 at which time the nuts 78 will be turned to lock the posts in their adjusted position. The operator can then look at the bubble of this level and if the bubble is centered properly this will indicate that the artificial horizon instrument has been properly set and the screws 6 may be tightened to firmly hold it in place upon the instrument board. If it is found that the bubble of the level B is not centered, the artificial horizon instrument may be turned in the proper direction to tilt the level until its bubble is properly centered and the screws 6 then tightened. It will thus be seen that the artificial horizon instrument may be properly set in true relation to the transverse horizontal axis of the airplane even when the airplane is resting upon uneven ground or one of the wheels of the landing gear is resting in a depression of the ground, as shown at 22. During setting of the instrument, the operator occupies the pilot's seat directly back of the artificial horizon instrument and the mirror of the level B will be swung out of a position over the bubble glass of the level B so that the operator may have an unobstructed view of the bubble. In view of the fact that the bar 27 of the level C will be disposed over the bubble glass of this level and present a clear view of the bubble even when its mirror has been swung to one side, the bracket has been provided with a mirror 79, the shank 80 of which is swiveled to the mirror so that the mirror may be turned about the axis of its shank. This shank 80 is pivoted to an arm 81 which is pivoted to a side arm 82 projecting from one side of the main bar or arm 50 of the bracket and it will be readily understood that the mirror may be swung from the position in which it may be resting to the position indicated by dotted lines in Figure 11 where the operator may clearly see a reflection of the bubble glass of the level C and determine whether or not the bubble of this level is properly centered. In case the bubble of this level is not centered, the artificial horizon instrument may be adjusted to center the bubble and then secured in the set position. The suction cups may then be released from the glass of the artificial horizon instrument and put away until again needed.

Having thus described the invention, what is claimed as new is:

1. An artificial horizon instrument testing and setting apparatus comprising in combination, a straight edged carrier, levels, means adapting the levels to be detachably secured upon said carrier, means for adjusting the levels whereby the angular relation of an aircraft to a true horizontal plane may be ascertained when the carrier with a level thereon is applied to the leveling lugs of the aircraft, and a carrier having means to detachably mount the same upon an artificial horizon instrument, the second carrier being adapted to receive the levels when transferred thereto from the straight edged carrier.

2. In an artificial horizon instrument testing and setting apparatus, the combination of a straight edged carrier of a length adapting it to be disposed in spanning relation to spaced leveling lugs of an aircraft, a second carrier, means to detachably hold the second carrier to an artificial horizon instrument, the second carrier being provided with means for detachably holding the levels when the levels are applied thereto, levels, and means for detachably mounting the levels in position longitudinally of the straight edged carrier, the levels being angularly adjustable whereby they may be set in accordance with the angular disposition of the fuselage and wings of an aircraft while applied to the straight edged carrier and then transferred to the level holding means of the second mentioned carrier and the artificial horizon instrument set in accordance with the set levels.

3. An artificial horizon instrument testing and setting device comprising levels, means to adjustably support the levels in position longitudinally of transverse and longitudinal axes of an aircraft whereby the levels may be set to record the angular relation of the axes to a horizontal plane, and means to be detachably applied to an artificial horizon instrument and having means to support the set levels in operative relation to the instrument with one level extending longitudinally of the aircraft and the other transversely thereof whereby the instrument may be accurately set in accordance with the levels.

4. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and a support having means to detachably hold the same applied to an artificial horizon instrument, said support having means to support the set levels in operative relation to the instrument with one level extending longitudinally of the aircraft and the other level transversely thereof whereby the instrument may be accurately set in accordance with the levels.

5. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument consisting of a bracket, means to mount the bracket against the instrument and support a level longitudinally of the aircraft, and an auxiliary bracket carried by the first bracket to support a level transversely of the aircraft.

6. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument consisting of a bracket, means to mount the bracket against the instrument in position to project outwardly therefrom and support a level longitudinally of an aircraft, and an auxiliary bracket carried by the first bracket and extending transversely thereof to support a level transversely of the aircraft over the longitudinally extending level.

7. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, means for supporting the levels in operative relation to an artificial horizon instrument consisting of a bracket, means to mount the bracket against the instrument in position to project outwardly therefrom and support a level longitudinally of an aircraft, and an auxiliary bracket pivoted to the first bracket and extending transversely of the first bracket over the level and supporting portion thereof to support a level transversely of an aircraft over the longitudinally extending level.

8. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, means for supporting the levels in operative relation to an artificial horizon instrument consisting of a bracket having a longitudinally extending bar adapted to support a level longitudinally thereof, a head at the front end of the bar, means carried by the head for mounting the bracket upon an artificial horizon instrument with the bar and a level carried thereby extending rearwardly from the instrument longitudinally of an aircraft, and an auxiliary bracket carried by said head over the bar transversely thereof for supporting a level transversely of an aircraft and longitudinally of wings of the aircraft.

9. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument after being set and removed from the fuselage and wings of the aircraft, said supporting means consisting of a bracket having a longitudinally extending bar formed with side flanges to retain a level upon the bar, a head rising from the front end of said bar and provided with a cross head at its upper end, and an auxiliary bracket extending longitudinally of the cross head and mounted thereon in a position to extend transversely over the bar of the first bracket and support a level transversely of an artificial horizon instrument at right angles to a level carried by the bar of the first bracket.

10. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument after being set and removed from the fuselage and wings of the aircraft, said supporting means consisting of a bracket having a longitudinally extending bar formed with side flanges to retain a level upon the bar, a head rising from the front end of said bar and provided with a cross head at its upper end, and means for detachably applying the bracket to an artificial horizon instrument with the bar projecting therefrom longitudinally of an aircraft, an auxiliary bracket pivoted to the cross head and extending longitudinally thereof over the bar of the first bracket for supporting a level over the cross bar at right angles to the level carried by the bar, and means for vertically adjusting the levels and supporting them in adjusted positions when applied to the brackets.

11. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument after being set and removed from the fuselage and wings of the aircraft, said supporting means consisting of a bracket having a longitudinally extending bar formed with side flanges to retain a level upon the bar, a head rising from the front end of said bar and provided with a cross head at its upper end, lugs projecting from the front faces of the head and cross head for bearing against an artificial horizon instrument, means to detachably mount the bracket to the artificial horizon instrument with a level carried by its bar disposed longitudinally of an aircraft, and means carried by the cross head for supporting a level over the bar of the bracket transversely of the first level and aircraft.

12. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument after being set and removed from the fuselage and wings of the aircraft, said supporting means consisting of a bracket having a longitudinally extending bar formed with side flanges to retain a level upon the bar, a head rising from the front end of said bar and provided with a cross head at its upper end, means for detachably applying the bracket to an artificial horizon instrument with the bar projecting therefrom longitudinally of an aircraft, an auxiliary bracket pivoted to the cross head and extending longitudinally thereof over the bar of the first bracket for supporting a level over the cross bar at right angles to the level carried by the bar, and means for vertically adjusting the levels and supporting them in adjusted positions when applied to the brackets.

13. An artificial horizon instrument testing and setting device comprising levels, means to adjustably support the levels in position longitudinally of the fuselage and wings of an aircraft whereby the levels may be set to record the angular relation of the fuselage and wings to a true horizontal plane, and means for supporting the levels in operative relation to an artificial horizon instrument after being set and removed from the fuselage and wings of the aircraft, said supporting means consisting of a bracket having a longitudinally extending bar formed with side flanges to retain a level upon the bar, a head rising from the front end of said bar and provided with a cross head at its upper end, means for detachably applying the bracket to an artificial horizon instrument with the bar projecting therefrom longitudinally of an aircraft, an auxiliary bracket pivoted to the cross head and extending longitudinally thereof over the bar of the first bracket, forks carried by the auxiliary bracket with their arms extending upwardly one back of another, whereby a level may be engaged between arms of the forks and supported transversely of an artificial horizon instrument over the bar of the first bracket at right angles to a level carried by the bar, and stems threaded upwardly through the forks between arms thereof for engaging under a level carried thereby and vertically adjust the level and support it in a vertically adjusted position.

JOHN E. TORBERT, Jr.